United States Patent [19]

Nuss

[11] Patent Number: 5,357,739
[45] Date of Patent: Oct. 25, 1994

[54] ROLLER RAKE APPARATUS

[76] Inventor: Leamon L. Nuss, 3845 Main St., Hinsdale, N.Y. 14743

[21] Appl. No.: 87,579

[22] Filed: Jul. 9, 1993

[51] Int. Cl.$^5$ ............................................. A01D 7/00
[52] U.S. Cl. ............................ 56/400.14; 56/400./16; 172/173
[58] Field of Search ............... 172/138, 170, 173, 174, 172/175, 195, 197, 350, 371, 375, 372, 373, 378, 379, 662; 56/400.01, 400.04, 400.05, 400.07, 400.14, 400.16, 400.17, 400.19, 400.21

[56] References Cited

U.S. PATENT DOCUMENTS

| | | | |
|---|---|---|---|
| 156,715 | 11/1874 | Skelton | 172/173 |
| 159,163 | 1/1875 | Downing | 172/173 |
| 188,484 | 3/1877 | Stegner | 172/173 |
| 255,978 | 4/1882 | Harvey | 172/173 |
| 322,919 | 7/1885 | Ferguson | 172/173 |
| 1,374,465 | 4/1921 | Oakes | 172/173 |
| 2,210,223 | 8/1940 | Taylor | 172/138 |
| 4,091,879 | 5/1978 | Lomberk et al. | 56/400.01 X |

Primary Examiner—Ramon S. Britts
Assistant Examiner—James A. Lisehora
Attorney, Agent, or Firm—Gary Alan Culliss

[57] ABSTRACT

A rake having a plurality of rows of spaced rake tines and a pair of weighted rollers disposed in an operational relationship between the rows of tines. The apparatus includes a substantially rectangular frame having rows of rake tines extending across a front end, a rear end, and medial portion for grating a ground surface. Weighted rollers are positioned between the rows and a handle is pivotally connected to the frame to facilitate an operation of the rake by a standing user. The apparatus is particularly suited for grating and leveling sand such as that found on a golf course.

4 Claims, 4 Drawing Sheets

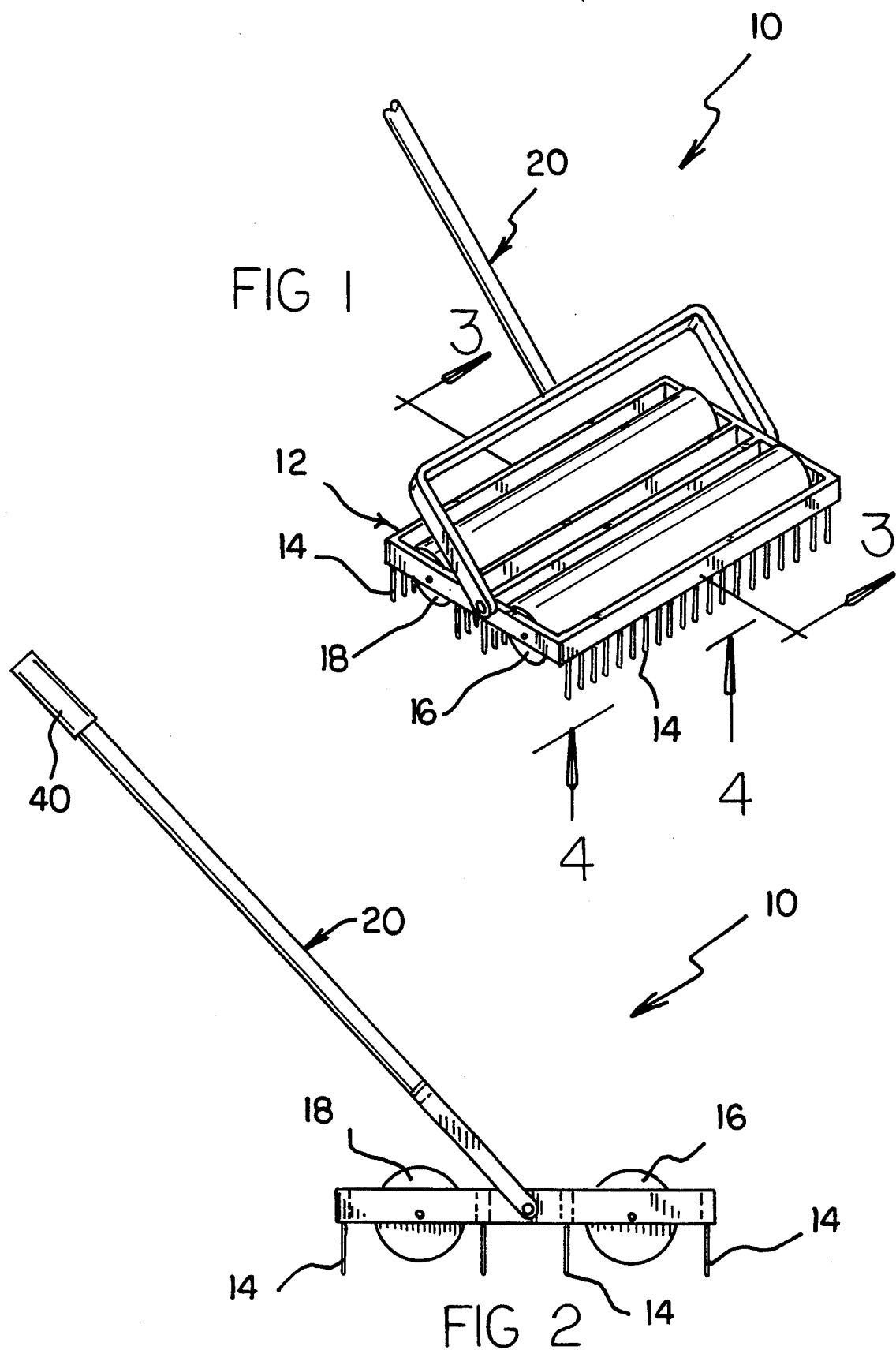

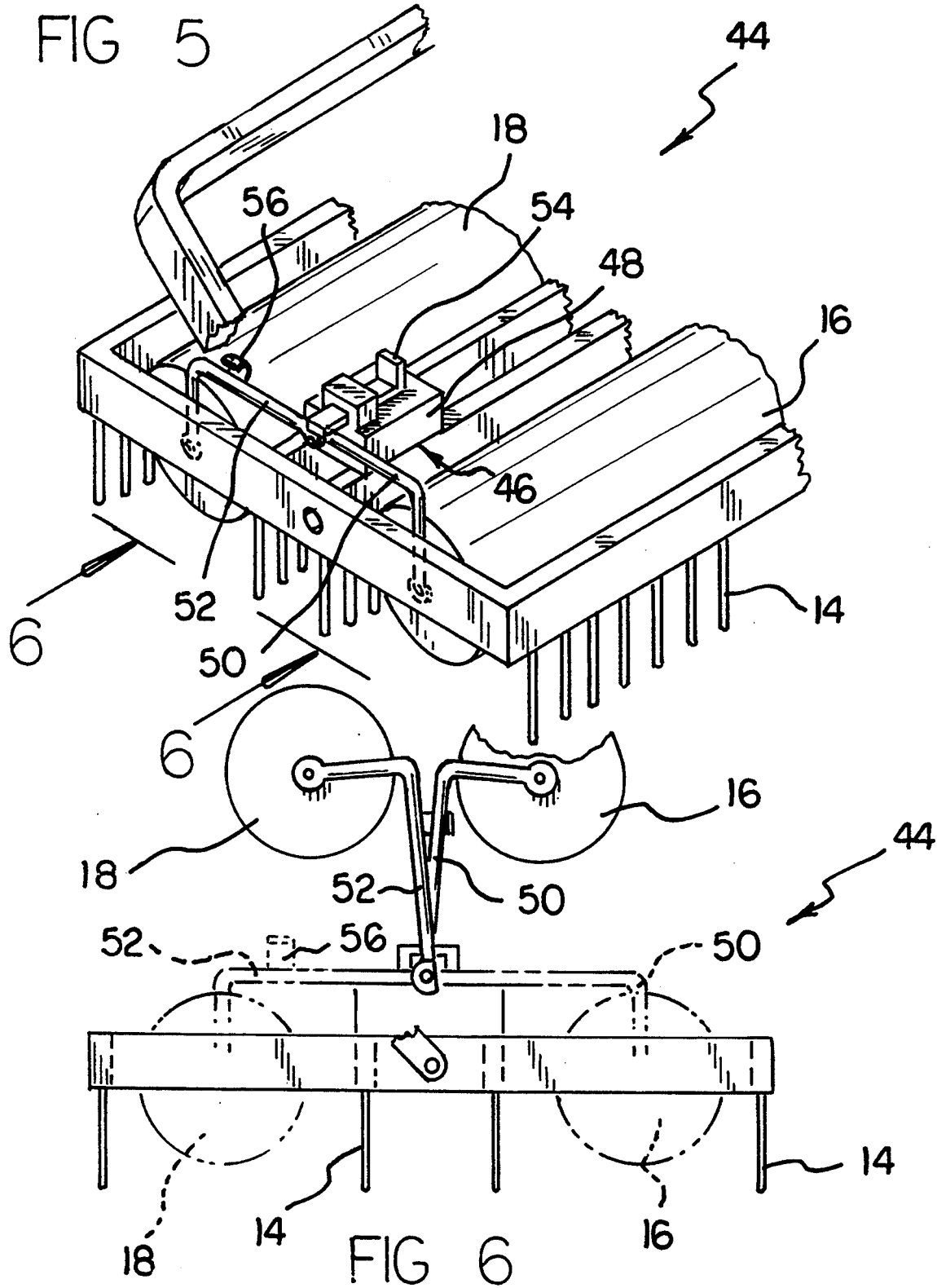

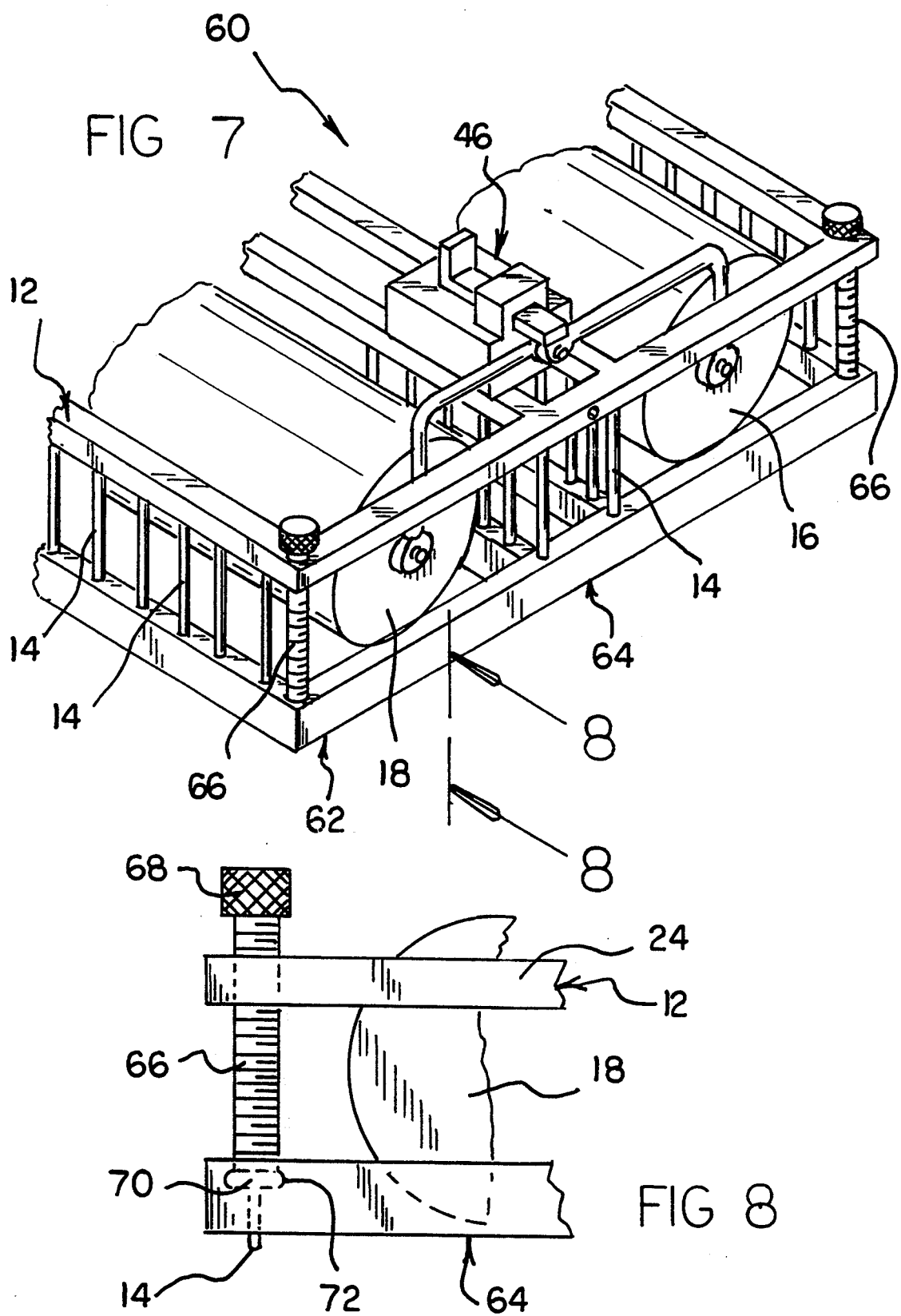

ROLLER RAKE APPARATUS

BACKGROUND OF THE INVENTION

1. Field of the Invention

The present invention relates to rakes and more particularly pertains to roller rake apparatuses which may be utilized for grating and leveling sand or other ground surfaces.

2. Description of the Prior Art

The use of rakes is known in the prior art. More specifically, rakes heretofore devised and utilized for the purpose of grating or clearing a ground surface are known to consist basically of familiar, expected and obvious structural configurations, notwithstanding the myriad of designs encompassed by the crowded prior art which have been developed for the fulfillment of countless objectives and requirements.

For example, a V-shaped lawn raking apparatus is illustrated in U.S. Pat. No. 5,040,365 which includes a wheeled unit adapted to detachably receive a generally V-shaped framework member having downwardly angled arm segments each provided with rake teeth thereon for removing and collecting debris as the apparatus is pushed across a lawn.

A lawn rake is described in U.S. Pat. No. 4,848,073 which includes a tine receiving rake head molded of a plastic material as an integral unit structure and includes a handle receiving portion and at least one tine mounting portion. The handle receiving portion includes a generally centrally located elongated socket portion for receiving therein one end of a handle to facilitate an ease of assembly.

Another patent of interest is a wheel rake as disclosed in U.S. Pat. No. 3,484,803 which illustrates a pull-type, rotary wheel, side delivery rake having a mobile main frame including a horizontal beam extending obliquely relative to the direction of travel for controlling a vertical position of the rake wheels.

Other relevant patents include U.S. Pat. Nos. 4,516,393, and 4,446,685.

While these devices fulfill their respective, particular objectives requirements, the aforementioned patents do not describe a roller rake apparatus having a plurality of rows of spaced rake tines and a pair of weighted rollers disposed in an operational relationship between the rows of tines for both leveling and grating sand or other ground surfaces.

In this respect, the roller rake apparatus according to the present invention substantially departs from the conventional concepts and designs of the prior art, and in so doing provides an apparatus primarily developed for the purpose of grating and leveling sand or other ground surfaces such as those found on a golf course.

SUMMARY OF THE INVENTION

In view of the foregoing disadvantages inherent in the known types of rakes now present in the prior art, the present invention provides a new roller rake apparatus construction wherein the same can be utilized for both grating and leveling sand or other ground surfaces. As such, the general purpose of the present invention, which will be described subsequently in greater detail, is to provide a new roller rake apparatus which has many of the advantages of the rakes mentioned heretofore and many novel features that result in a roller rake apparatus which is not anticipated, rendered obvious, suggested, or even implied by any of the prior art rakes, either alone or in any combination thereof.

To attain this, the present invention essentially comprises a rake having a plurality of rows of spaced rake tines and a pair of weighted rollers disposed in an operational relationship between the rows of tines. The apparatus includes a substantially rectangular frame having rows of rake tines extending across a front end, a rear end, and medial portion thereof. Weighted rollers are positioned between the rows and a handle is pivotally connected to the frame for operation thereof by a standing user. The apparatus is particularly suited for grating and leveling sand such as that found on a golf course.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new roller rake apparatus which has many of the advantages of the rakes mentioned heretofore and many novel features that result in a roller rake apparatus which is not anticipated, rendered obvious, suggested, or even implied by any of the prior art rakes, either alone or in any combination thereof.

It is another object of the present invention to provide a new roller rake apparatus which may be easily and efficiently manufactured and marketed.

It is a further object of the present invention to provide a new roller rake apparatus which is of a durable and reliable construction.

An even further object of the present invention is to provide a new roller rake apparatus which is susceptible of a low cost of manufacture with regard to both materials and labor, and which accordingly is then susceptible of low prices of sale to the consuming public, thereby making such roller rake apparatus economically available to the buying public.

Still yet another object of the present invention is to provide a new roller rake apparatus which provides in the apparatuses and methods of the prior art some of the advantages thereof, while simultaneously overcoming some of the disadvantages normally associated therewith.

Still another object of the present invention is to provide a new roller rake apparatus having a plurality of rows of spaced rake tines and a pair of weighted rollers disposed in operational relationship between the rows of tines.

Yet another object of the present invention is to provide a new roller rake apparatus which may be utilized for both grating and leveling sand or other ground surfaces such as those found on a golf course.

Even still another object of the present invention is to provide a new roller rake apparatus in which a length of the rake tines may be infinitely adjusted.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof, Such description makes reference to the annexed drawings wherein:

FIG. 1 is a perspective view of a roller rake apparatus comprising the present invention.

FIG. 2 is a side elevation view of the present invention.

FIG. 5 is an enlarged perspective view of a portion of a second embodiment of the present invention.

FIG. 6 is a side elevation view of the second embodiment.

FIG. 7 is an enlarged perspective view of a portion of a third embodiment of the present invention.

FIG. 8 is an enlarged side elevation view of portion of the third embodiment.

DESCRIPTION OF THE PREFERRED EMBODIMENTS

Figure 3:
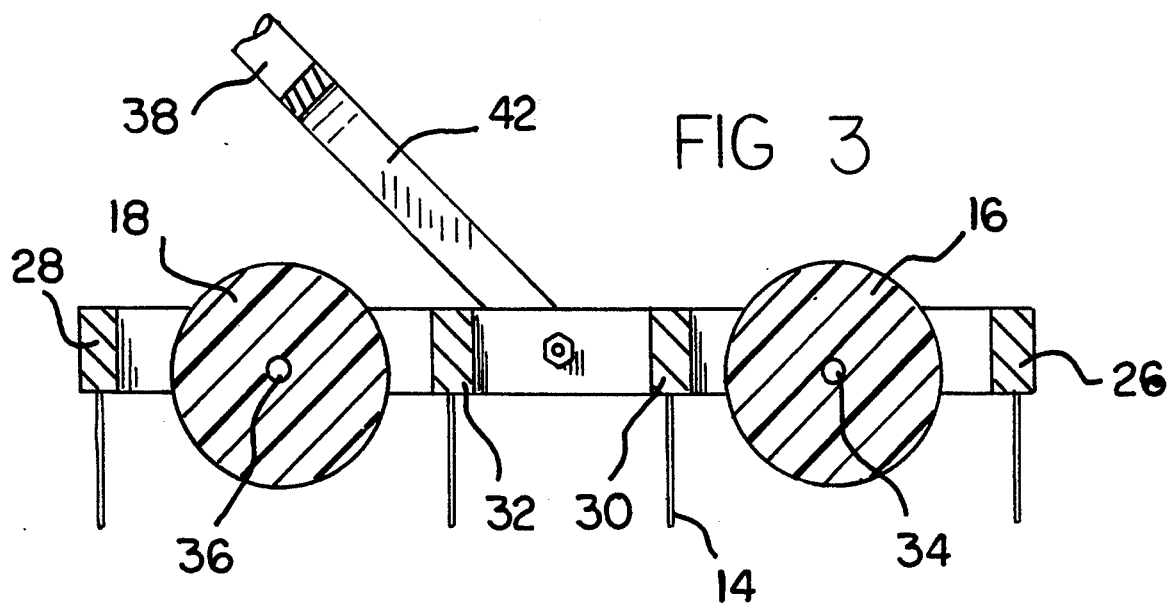
FIG. 3 is a cross sectional view taken along line 3—3 of FIG. 1.

With reference now to the drawings, and in particular to FIGS. 1-4 thereof, a new roller rake apparatus embodying the principles and concepts of the present invention and generally designated by the reference numeral 10 will be described.

The roller rake apparatus 10 comprises a substantially rectangular frame 12 from which a plurality of rake tines 14 orthogonally project. The tines 14 are arranged in parallel spaced rows and a pair of rollers 16, 18 are rotatably coupled to the frame 12 and positioned between the parallel spaced rows of tines 14. A handle assembly 20 is pivotally connected to the frame 12 and allows a user to manipulate the roller rake apparatus 10 from a standing position. In use, the roller rake apparatus 10 may be positioned upon a surface to be groomed such as sand, dirt, fine gravel, and the like, and reciprocated by the user, whereby the tines 14 substantially grate the surface and the rollers 16, 18 operate to level the surface.

Figure 4:
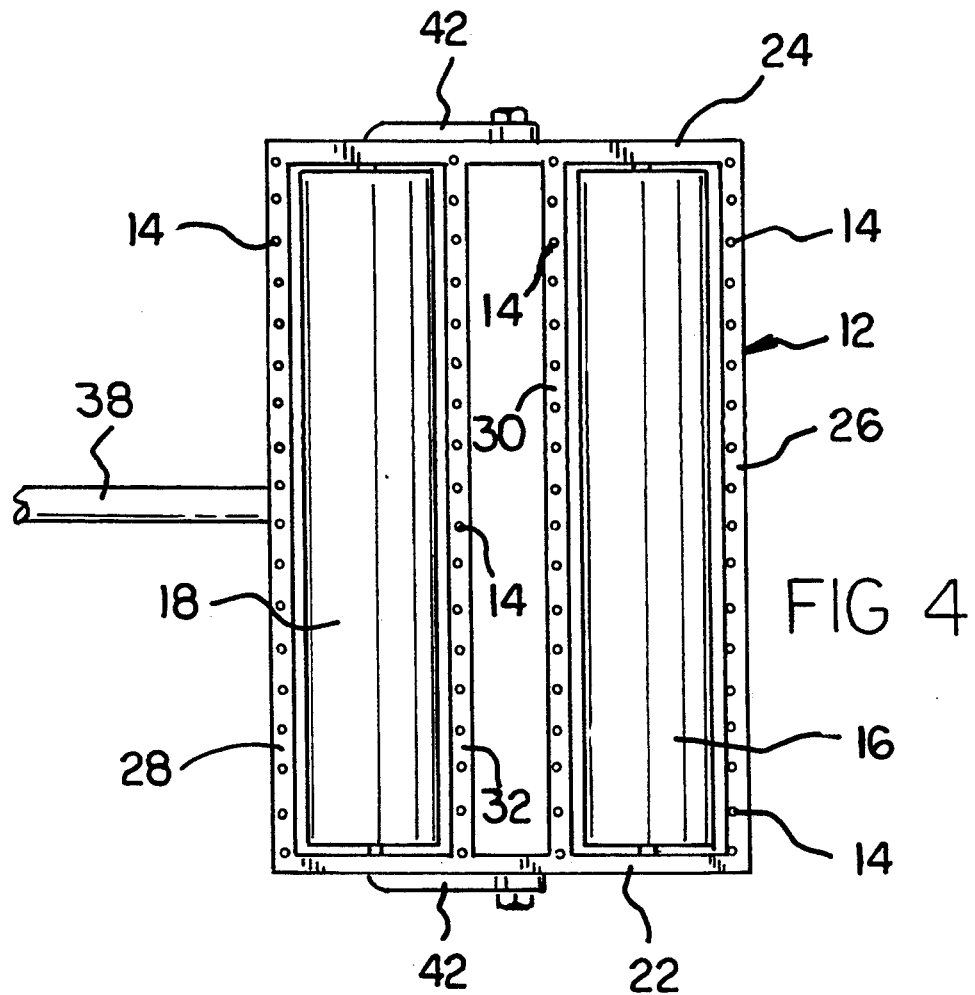
FIG. 4 is a bottom plan view as viewed from line 4—4 of FIG. 1.

More specifically, it will be noted that the roller rake apparatus 10 comprises a substantially rectangular frame 12 comprising a pair of side members 22, 24 which are orthogonally connected to respectively opposed ends of both a front member 26 and a rear member 28, as best illustrated in FIG. 4. A pair of center members 30, 32 are positioned in a parallel, aligned relationship to both the front member 26 and the rear member 28 and are fixedly secured to the pair of side members 22, 24, proximate a medial portion thereof. A plurality of tines 14 are positioned in a spaced relationship along the front member 26, the rear member 28, and the center members 30, 32 and project orthogonally away therefrom.

A pair of rollers 16, 18 are positioned between the front and rear members 26, 28 and the center members 30, 32, respectively, and are rotatably supported upon axles 34, 36 which pass through an axial center of the roller and engage the frame 12. The rollers 16, 18 are illustrated in FIG. 3 as having a solid cross section, but it is within the intent and purview of the present invention to include rollers which are hollow and also rollers which have surface variations, such as patterns and the like, present thereon.

Pivotally connected to the frame 12 is a handle assembly 20 which allows a user to manipulate the roller rake apparatus 10 from a standing position. The handle assembly 20 comprises a substantially tubular handle 38 having a grip 40 at a first end and a substantially U-shaped member 42 secured to a second end thereof. The U-shaped member 42 is pivotally coupled to the pair of side members 22, 24 in a manner which allows the handle assembly 20 to rotate with respect to the frame 12, thereby allowing the frame to reside flatly against a ground surface independent of a position of the handle assembly 20.

In use, the roller rake apparatus 10 may positioned upon any surface to be both grated and leveled and then reciprocated by a user in a well understood manner. The tines 14 are operable to grate the ground surface and segregate any debris present therein. The rollers 16, 18 help to flatten any ground irregularities such foot prints, divots, and the like from the ground surface being raked.

A second embodiment of the present invention as generally designated by the reference numeral 44, which comprises substantially all of the features of the foregoing embodiment 10 and which further comprises a floating roller support assembly 46 will now be described. As best shown in FIGS. 5-6, it can be shown that the floating roller support assembly 46 allows the rollers 16, 18 to independently move with respect to the frame 12 in a plane substantially parallel thereto.

A pair of floating roller support assemblies are utilized to support both ends of each roller 16, 18. Only one of such pair of floating roller support assemblies is shown in FIG. 5 and it will be described in detail with it being understood that both of the floating roller support assemblies are substantially similar in design and function. Continuing then, it can be seen that the floating roller support assembly 46 comprises a pivot block 48 which is fixedly secured to the center members 30, 32 and which pivotally supports a pair of roller support arms 50, 52 thereon. The roller support arms 50, 52 project away from the pivot block 48 and are angled downward to support the rollers 16, 18 within the frame 12 as shown by the phantom illustration of FIG. 6. A catch 54 is slidably coupled to the pivot block 48 and is operable to secure the roller support arms 50, 52 in a down position, as best shown in FIG. 5. The catch 54 may be moved so as to allow the roller support arms 50, 52 to freely pivot upon the pivot block, thereby allowing the rollers 16, 18 to move with respect to the frame 12. A clip 56 is fixedly secured to the roller support arm 52 and is operable to engage the other roller support arm 50 to retain the roller support arms in a coupled relationship as shown in FIG. 6.

Comprising all the features and structure of the previous embodiments 10, 44 is a third embodiment which is generally designated by the reference numeral 60 and may be viewed in FIGS. 7-8. It can be shown that the third embodiment 60 further comprises an adjustable tine assembly 62 which allows a depth of the tines to be adjusted in an efficient manner. The adjustable tine assembly 62 comprises a further frame assembly 64 which is formed in a substantially identical manner as that of the frame 12. The further frame assembly 64 has a plurality of apertures which allow the tines to pass therethrough so that the further frame assembly may slide along the tines relative to the frame 12. A plurality of adjustment screws 66 are threadably engaged to the frame 12 and rotatably secured to the further frame assembly 64, as best shown in FIG. 8. The adjustment screws 66 each include a knurled grip 68 at a first end and an enlarged portion 70 at a second end thereof. The enlarged portion 70 of each of the adjustment screws 66 is operable to be received within a cavity 72 of the further frame assembly 64. Each of the adjustment screws 66 may be rotated with respect to the frame 12 to either increase or decrease a distance between the frame and the further frame assembly 64 to allow either a lesser or a greater portion, respectively, of each of the tines 14 to project through the further frame assembly and engage the ground surface upon which the third embodiment 60 is being operated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A roller rake apparatus comprising:

a substantially rectangular frame having a front member, a rear member, a pair of center members, and a pair of side members, said side members being orthogonally connected to respectively opposed ends of both said front member and said rear member, and said center members being orthogonally connected to medial portions of both said front member and said rear member, with said center members being positioned in a parallel, spaced relationship to one another;

a handle having a lower end with a substantially U-shaped member secured to said lower end thereof, said U-shaped member being pivotally coupled to said frame;

a plurality of rake tines projecting orthogonally downward from said frame;

a pair of generally L-shaped first roller support arms pivotally mounted to said frame said first roller support arms each having a distal end positioned medially between said front member and one of said center members;

a pair of generally L-shaped second roller support arms pivotally mounted to said frame, said second roller support arms each having a distal end positioned medially between said rear member and another of said center members;

a first cylindrical roller rotatably mounted to said pair of first roller support arms between said distal ends of said first roller support arms; and, a second cylindrical roller rotatably mounted to said second roller support arms between said distal ends of said second roller support arms.

2. The roller rake apparatus as recited in claim 1, and further comprising a further frame of substantially identical configuration relative to said frame, said further frame having a plurality of apertures aligned with said tines of said frame, with said tines projecting through said apertures of said further frame, and a plurality of adjustment screws threadably engaged to said frame and rotatably secured to said further frame, each of said adjustment screws being operable to vary a distance between said frame and said further frame to vary an amount of each of said tines projecting through said further frame.

3. The roller rake apparatus as recited in claim 2, and further comprising locking means coupled to said frame for selectively precluding a pivoting of said roller support arms relative to said frame.

4. A roller rake apparatus comprising:

a substantially rectangular frame having a front member, a rear member, a pair of center members, and a pair of side members, said side members being orthogonally connected to respectively opposed ends of both said front member and said rear member, and said center members being orthogonally connected to medial portions of both said front member and said rear member, with said center members being positioned in a parallel, spaced relationship to one another;

a handle having a lower end with a substantially U-shaped member secured to said lower end thereof, said U-shaped member being pivotally coupled to said frame;

a plurality of rake tines projecting orthogonally downward from said frame;

a further frame of substantially identical configuration relative to said frame, said further frame having a plurality of apertures aligned with said tines of said frame, with said tines projecting through said apertures of said further frame;

a plurality of adjustment screws threadably engaged to said frame and rotatably secured to said further frame, each of said adjustment screws being operable to vary a distance between said frame and said further frame to vary an amount of each of said tines projecting through said further frame;

a first cylindrical roller rotatably mounted to said frame between said front member and one of said center members and between said side members; and, a second cylindrical roller rotatably mounted to said frame between said rear member and another of said center members and between said side members.

* * * * *